United States Patent [19]
Farmer

[11] Patent Number: 5,748,295
[45] Date of Patent: May 5, 1998

[54] METHOD AND APPARATUS FOR DETERMINING THE RANGE, DIRECTION AND VELOCITY OF AN OBJECT

[75] Inventor: Brian W. Farmer, Norcross, Ga.

[73] Assignee: University of Georgia Research Foundation, Athens, Ga.

[21] Appl. No.: 688,706

[22] Filed: Jul. 31, 1996

[51] Int. Cl.⁶ .................... G01C 3/08; G01P 3/36
[52] U.S. Cl. .................... 356/5.09; 356/28.5
[58] Field of Search .................... 356/5.09, 28.5

[56] References Cited

U.S. PATENT DOCUMENTS

| | | | |
|---|---|---|---|
| 3,733,129 | 5/1973 | Bridges | 356/5 |
| 5,069,545 | 12/1991 | Hinz | 356/28.5 |
| 5,267,016 | 11/1993 | Meinzer et al. | 356/358 |
| 5,594,543 | 1/1997 | de Groot et al. | 356/5.09 |

*Primary Examiner*—Mark Hellner
*Attorney, Agent, or Firm*—Deveau, Colton & Marquis

[57] ABSTRACT

The present invention provides a range finding system which utilizes feedback to induce mode hopping in a standing wave generator and which determines the range, direction and velocity of an object with respect to the range finding system based on the mode hop rate. The present invention provides a novel sampling technique which prevents aliasing by modulating the standing wave generator at a frequency equal to or greater than $\pi$ times the frequency at which the optical path between the object and the standing wave generator is oscillating or vibrating. In order to account for Doppler effect, the standing wave interference coupling is analyzed over one period of the frequency modulation rate of the standing wave generator. A spectral analysis algorithm is implemented which determines the mode hop rate of the standing wave generator and the range, direction and velocity of the object with respect to the range finding system based on the determined mode hop rate. Implementation of the spectral analysis algorithm improves signal-to-noise ratio by avoiding thresholding to provide a range finding system which is substantially amplitude independent.

20 Claims, 11 Drawing Sheets

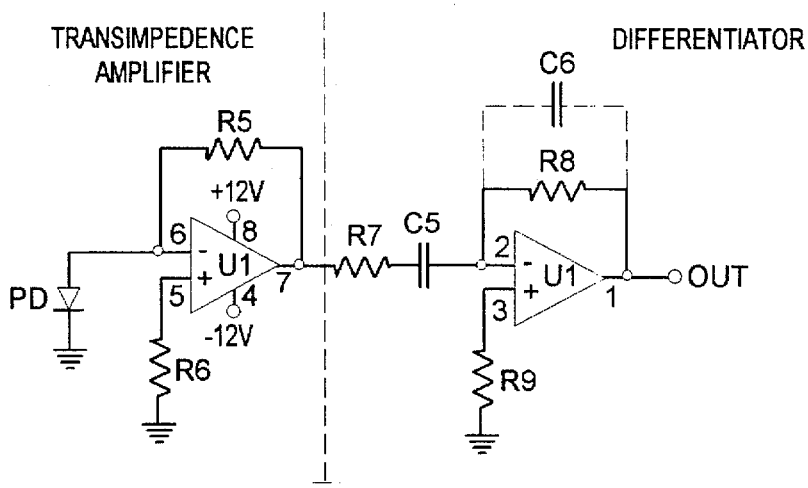
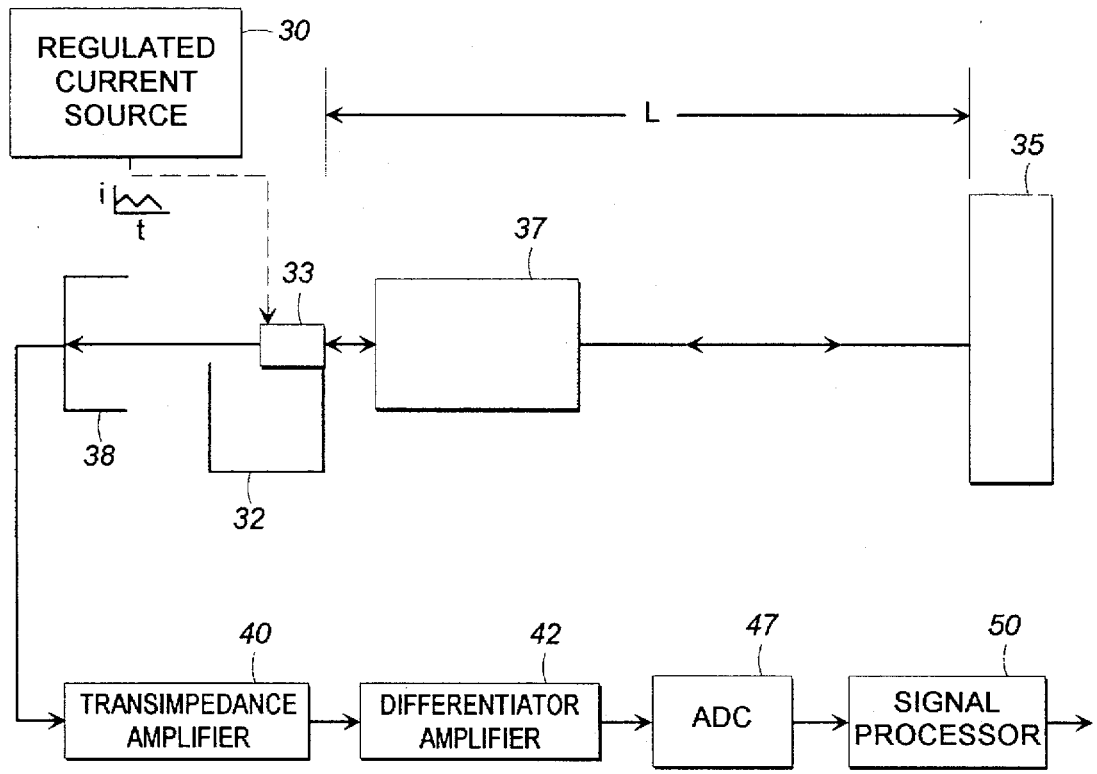
FIG. 6
FIG. 7

(d) MINIMUM VARIANCE SPECTRAL ESTIMATOR (e) AUTOCORRELATION (f) BURG (j) MODIFIED YUKE-WALKER EQUATIONS (k) LEAST SQUARES MODIFIED YUKE-WALKER EQUATIONS

METHOD AND APPARATUS FOR DETERMINING THE RANGE, DIRECTION AND VELOCITY OF AN OBJECT

BACKGROUND OF INVENTION

The present invention is directed to a method and apparatus for determining the range, direction and velocity of an object and, more particularly, to a range finding system which utilizes a coherent frequency sweeping, sweept or modulated standing wave generator to project a standing wave onto an object and which determines the mode hop rate of the coherent standing wave generator resulting from feedback from the object. The determined mode hop rate is used to determine the range, direction and velocity of the object. Preferably, the present invention utilizes a laser, maser, or matter wave generator as the standing wave generator to produce a substantially coherent standing wave.

Various types of optical range finding systems are available which determine the range of an object with respect to the optical range finding system. These systems generally operate by using lasers to project a collimated beam of monochromatic, coherent light onto an object, detecting the light reflected from the object with an optical sensor which converts the optical signal into an electrical signal, and processing the electrical signal to determine the location or range of the object with respect to the range finding system. The locations of the laser and optical sensor of a typical laser range finding system generally are selected in accordance with the size of the object sensing area being used. For example, the laser and optical sensor can be arranged in a transceiver configuration (optically coaxially aligned with one another) so that the point at which the light is projected from the laser is, for all practical purposes, the same point at which the light reflected from the object is received by the optical sensor. Another well known configuration is the side-by-side configuration in which the laser and the optical sensor are disposed side-by-side but spatially separated.

When a very narrow object sensing area is being used, a transceiver-type configuration is preferred over the side-by-side configuration because the angle of reflection of the light from the object is usually very small. Also, by using a narrow object sensing area, noise from other sources, such as light reflected from objects other than the object under investigation, can be minimized. Therefore, where the object or target under investigation is very small, a laser range finding system which incorporates a transceiver-type configuration is preferred because the object sensing area necessarily is small.

At the present time, at least three different types of optical range finding systems which utilize lasers are commercially available: (1) time-of-flight systems; (2) triangulation systems; and (3) interferometric or optical feedback systems. The time-of-flight systems can be further subdivided into: (1) discrete time-of-flight systems; (2) tone-modulated continuous wave (CW) radar systems; and (3) frequency-modulated (FM) CW radar systems. The discrete time-of-flight systems determine the distance of an object from the system by measuring the time it takes for light to travel from the source to the object and back to the light sensor positioned at the source.

This technique is based on the principle that incoherent phase is proportional to distance. Discrete time-of-flight systems project short pulses of light from the source and measure the time it takes for the light to return to the source. The distance of the object from the source is then determined based on the amount of time it takes the light to return to the source. One disadvantage of the time-of-flight analysis is that when relatively short distances are being measured, fairly expensive hardware is required due to the speed of light and difficulties in detecting very small differences between the time the light is projected from the source and the time the light is received at the optical sensor positioned at the source.

As with the discrete time-of-flight systems, the continuous wave time-of-flight systems also require fairly expensive hardware. However, the continuous wave time-of-flight systems overcome the problems of the discrete time-of-flight systems associated with measuring small differences in time by continuously power modulating the laser beam with single or multiple frequencies and measuring phase differences to determine the distance of an object from the system. However, the continuous wave time-of-flight systems generally require large, heavy enclosures due to their optical and electrical complexities.

Triangulation relies on basic trigonometry involving amplitude backscatter of light rather than phase. By projecting a narrow beam of light onto a target, a very small area of an object surface will be illuminated. Since the projection angle of the beam and the separation between the light source and the receiver are known, range can be computed by solving the trigonometry of the triangle by using the Law of Sines.

Generally, these types of systems suffer from the disadvantage that their range of detectability is relatively small while their size is relatively large. Furthermore, such systems suffer from the disadvantage that, because they are amplitude dependent, they have an inherent error due to variable target angles and variable target quality.

Another disadvantage of these types of systems is that they have a small line-of-sight sensing area because they use a side-by-side transmitter/receiver configuration which generally makes them unsuitable for measuring very small targets. For example, if it were necessary to measure the depth of a hole having a bottom with a very small diameter, the angle of reflection will be too small for measurement by the side-by-side configuration, thereby resulting in unsatisfactory measurements.

Interferometric ranging techniques are known which are based on the principle of light wave interference which occurs when two standing waves of light are superimposed on each other. The sources of the two standing waves are in the same space at the same time and can interfere between the same point source and its reflected wave or between different point sources. The principles of interferometry were discovered by A. A. Michelson in 1881. Due to the monochromaticity and coherence of laser light, destructive and constructive light wave interference can be observed as light and dark interference fringe bands. The distance of the range finding system from the object can then be determined from the interference fringe bands.

Interferometric ranging techniques are based on a two-beam Doppler effect and suffer from the disadvantage that the Doppler effect for length measurements only allows accumulated length to be determined, not absolute range. The accumulated length measurements are derived from dynamic displacements, or velocities, of the object.

Another type of interferometric ranging technique was developed by Beheim and Fritsch uses the phenomenon of mode hopping and is discussed in an article entitled "Range Finding Using Frequency-Modulated Laser Diode" in *Applied Optics*, Vol. 25, No. 9, May 1986, pages 1439–1442. Similar interferometric ranging techniques are discussed in "Compact and High Precision Range Finder With Wide Dynamic Range Using One Sensor Head", by Shinohara, et al., 1991 IEEE, "A Laser Diode Velocimeter and Rangefinder", thesis by Dipak Patel 1989, "Optical Feedback Displacement Sensor Using a Laser Diode and its Performance Improvement", by Kato, et al., *Meas. Sci. Technol.* 6 (1995), and "Ranging And Velocimetry Signal Generation In A Backscatter-Modulated Laser Diode", by P. J. de Groot, et al.

These techniques utilize optically-induced mode hops to determine the range of an object under investigation. However, these articles do not take into account mechanical vibration of the object with respect to the system, which causes aliasing resulting in annihilation of the measured data. Since mechanical vibration normally will be present in all practical applications and, therefore, will have to be taken into consideration, these systems will not be satisfactory for many practical applications. Furthermore, vibration due to oscillation of the target not caused by mechanical noise vibration must also be taken into account. Thus, a need exists for a range finding system which provides a solution to the vibration problems of these known systems and which utilizes feedback-induced mode hops for determining the range, direction and velocity of an object. The present invention generally utilizes the principles of the ranging technique developed by Beheim and Fritsch but provides, inter alia, solutions to the problems associated with the system of Beheim and Fritsch to provide a range finding system which utilizes feedback-induced mode hops to detect the range of an object from the system and the direction and velocity of the object with respect to the system and which is well suited for practical applications due to its ability to prevent aliasing.

BRIEF SUMMARY OF THE INVENTION

The present invention provides a range finding system which utilizes a coherent standing wave generator for generating a standing wave, means for projecting the standing wave onto an object, a detector for detecting standing wave interference resulting from interference between the generated standing waves and standing waves reflected from the object and for producing electrical signals relating to the detected standing wave interference, and signal processing means for processing the electrical signals to determine the mode hop rate of the standing wave generator and for determining the range, direction and velocity of the object with respect to the range finding system based on the determined mode hop rate.

Accordingly, it is an object of the present invention to provide a range finding system which utilizes the phenomenon of mode hopping resulting from standing wave interference to determine the range, direction and velocity of an object with respect to the range finding system.

It is another object of the present invention to provide a laser range finding system which overcomes the problems of existing laser range finding systems associated with aliasing to provide a laser range system which can be implemented in practical applications outside of a laboratory environment.

It is yet another object of the present invention to provide a range finding system which uses mode hopping to determine the range, direction and velocity of an object with respect to the system and which compensates for mechanical vibrations and/or oscillations of the object by generating a frequency modulated standing wave at a frequency equal to or greater than $\pi$ times the frequency at which the position of the object under inspection with respect to the system is oscillating.

It is yet another object of the present invention to provide a substantially amplitude-independent range finding system which utilizes spectral analysis techniques to determine the mode hop rate occurring in a standing wave generator due to feedback for determining the range, direction and velocity of an object.

It is yet another object of the present invention to provide a range finding system with improved signal-to-noise ratio.

It is yet another object of the present invention to provide a range finding system which utilizes a digital signal processor capable of high speed calculations for determining the range, direction and velocity of an object with respect to the system in real time.

It is yet another object of the present invention to provide a range finding system which is robust and, at the same time, economical.

It is yet another object of the present invention to provide a range finding system which utilizes a transceiver configuration to detect the range, velocity and direction of an object with respect to the range finding system.

It is yet another object of the present invention to provide a range finding system for detecting the range, direction and velocity of an object or surface with respect to the system using a small sensing area under conditions where the angle of reflection of the standing wave from the object is either very small or equal to zero.

It is yet another object of the invention to provide a range finding system which is capable of detecting the range, direction and velocity of an object which is vibrating or oscillating at high speeds with respect to the system.

These and other objects and advantages of the present invention will become apparent from the following description, drawings and claims.

BRIEF DESCRIPTION OF THE DRAWINGS

FIG. 6 is a schematic diagram of circuit components which can be used to determine the mode hop rate in accordance with the present invention.

FIG. 7 illustrates a block diagram of a second embodiment of the range finding system of the present invention.

DETAILED DESCRIPTION OF THE INVENTION

Figure 1:
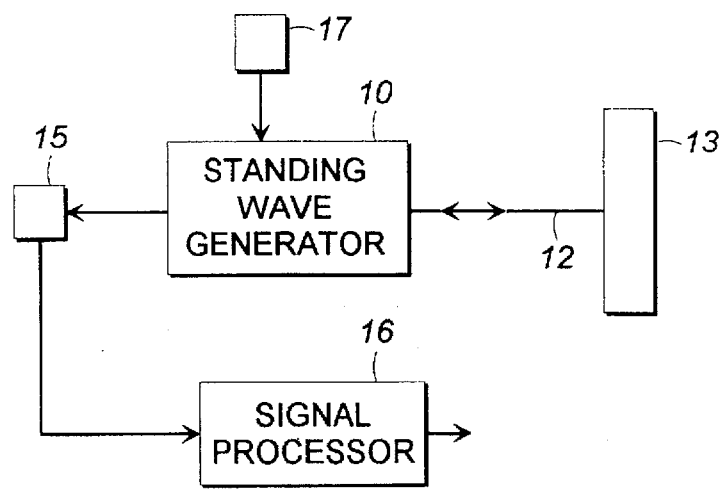
FIG. 1 illustrates a block diagram of the basic elements of the range finding system of the present invention.

FIG. 1 illustrates a block diagram of the basic elements of the range finding system of the present invention. The range finding system of the present invention generally comprises a standing wave generator 10 for generating a coherent standing wave and for projecting the coherent standing wave 12 onto an object or target 13, means 17 for frequency modulating the standing wave generator, an optical detector 15, and a signal processor 16. When coherent standing waves are projected onto the object 13, at least a portion of the standing waves are reflected from the surface of the object back into the standing wave generator 10 as feedback due to diffuse backscatter from the target and use of a highly collimated coherent standing wave. The standing wave feedback interferes constructively and destructively with the standing waves being generated by the standing wave generator 10, which results in mode hopping of the standing wave generator 10. The mode hop phenomenon is discussed in detail below with respect to FIGS. 8 and 9.

A standing wave detector 15 receives standing waves from the standing wave generator 10, including the standing waves resulting from interference due to feedback.

Detector 15 produces electrical signals in response to the detected standing waves and outputs the electrical signals to a signal processor 16. The signal processor 16 processes the information received from detector 15 and determines the mode hop rate of the standing wave generator 10. The mode hop rate is related to the range, direction and velocity of the object 13 with respect to the standing wave generator 10.

The signal processor 16 determines the range, direction and velocity of the object 13 with respect to the standing wave generator 10 based on the determined mode hop rate of the standing wave generator 10, as discussed in detail below.

In accordance with the present invention, a novel sampling technique has been developed which allows the range finding system depicted in FIG. 1 to be implemented in practical applications for determining the range, direction and velocity of the object 13 with respect to the standing wave generator 10 in real time. Under ordinary conditions, mechanical vibrations will affect the system and/or the object which results in oscillations of the position of object 13 with respect to the standing wave generator 10. The object or target may oscillate even without mechanical noise vibration, such as when the object under investigation is a rotating disc. The frequency of these oscillations generally will depend on the nature of the object and/or of the application in which the system is being implemented. In accordance with the present invention, it has been discovered that in order to compensate for these mechanical vibrations or oscillations, the object 13 must be sampled at a rate equal to or greater than $\pi$ times the frequency at which the optical path between the standing wave generator 10 and the object 13 is oscillating in order to prevent aliasing. To accomplish this, it has been determined that the standing wave generator 10 must be frequency modulated at a frequency equal to or greater than $\pi$ times the frequency at which the position of the object 13 with respect to the standing wave generator 10 is oscillating. A frequency modulator 17, such as an ac current source, frequency modulates the standing wave generator 10 for producing a frequency modulated standing wave having a frequency equal to or greater than $\pi$ times the frequency at which the optical path between the object 13 and the standing wave generator 10 is modulating. Different types of hardware components which can be implemented to construct the system of FIG. 1 are discussed in detail below with respect to FIGS. 4 and 7.

In accordance with a preferred embodiment of the present invention, a laser is used as the standing wave generator of the range finding system of the present invention for generating a substantially monochromatic, substantially coherent standing wave. However, it will be apparent to those skilled in the art after reading the present application that the present invention is not limited with respect to the type of standing wave generator used. For example, a maser or a matter wave generator would also be suitable for use with the present invention as the standing wave generator. Matter wave generators currently are being used in semiconductor fabrication to etch features.

In accordance with the present invention, a matter wave generator could simultaneously be used to etch features and to determine the range, direction and velocity of the semiconductor substrate with respect to the matter wave generator.

Figure 2:
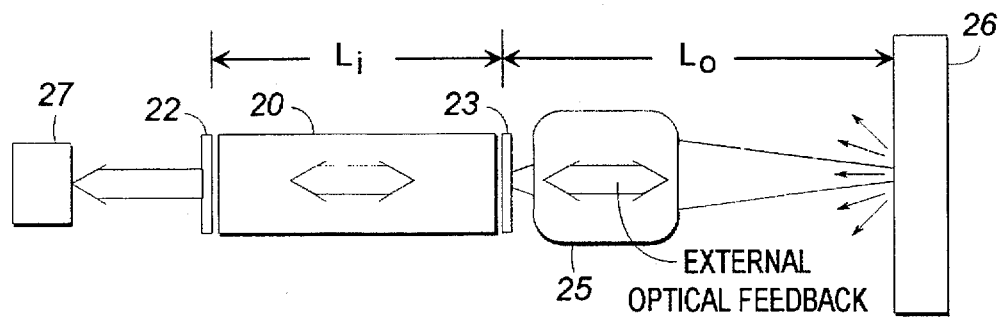
FIG. 2 illustrates a schematic diagram of a typical laser diode which is suitable for use with the range finding system of the present invention.

FIG. 2 is a schematic diagram of a typical laser diode which is suitable for use with the system of the present invention. The laser diode comprises an optical cavity 20 having an amplifying medium disposed therein for emitting the radiation needed to produce a beam of substantially monochromatic, substantially coherent light. The optical cavity 20 has means for receiving power from a power supply (not shown) for exciting the amplifying medium. Partially transmissive mirrors 22, 23 are located on each end of the optical cavity 20 for reflecting the light produced by the laser medium within the optical cavity 20 such that the optical cavity 20 acts as a resonator to concentrate the light produced to stimulate the emission of laser radiation. Thus, the optical cavity 20 with the partially transmissive mirrors 22, 23 located on each end acts as an amplifier for amplifying the laser light.

As the laser light is amplified in the optical cavity 20, a beam of substantially monochromatic, substantially coherent light is transmitted through each of the partially transmissive mirrors 22, 23. A lens 25 is positioned adjacent the forward end of the optical cavity 20 for collimating the light transmitted through partially transmissive mirror 23 to produce a narrow beam of laser light for projection of the light onto the target 26. An optical detector 27, such as a photodiode, is positioned adjacent the back end of the optical cavity 20 for receiving light transmitted through partially transmissive mirror 22. The optical detector 27 converts the optical signals into electrical signals and is normally used to regulate the power supply to the laser for maintaining the intensity of the laser light at a substantially constant level. The laser diode depicted schematically in FIG. 2 utilizes a graded refractive index (GRIN) lens for collimating the laser light. The laser diode and the photodiode are typically contained within a laser canister (not shown) which is coupled to the collimating lens 25. However, means for collimating the laser light may instead be integrated with the laser diode and photodiode within the laser canister.

Several different types of lasers are suitable for use with the present invention.

The type of laser, optical detector and collimating lens selected for use with the present invention will generally depend on the cost of these components, the power desired to be produced by the laser, and the desired diameter of the collimated laser beam. For example, an ML44114 single mode laser which includes a photodiode within its laser diode package, manufactured by Mitsubishi, was found to be suitable for use with the present invention. A Melles Griot focusable diode laser collimator assembly was found to be suitable for use with the present invention. It will be apparent to those skilled in the art that the present invention is not limited to any particular hardware components and that it can be implemented in a variety of different ways using a variety of different components.

Figure 3:
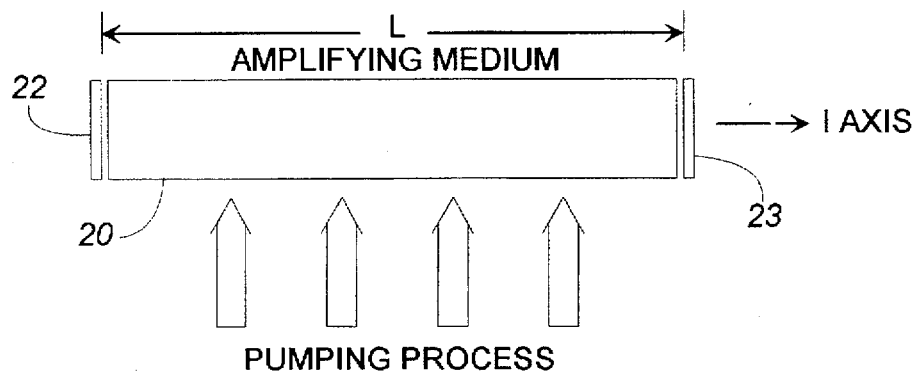
FIG. 3 is a schematic diagram of the laser of FIG. 2 which illustrates the pumping process whereby the radiation emissions produced by the laser are amplified to produce a substantially monochromatic, substantially coherent standing light wave.

FIG. 3 is a schematic diagram of the laser of FIG. 2 which illustrates the pumping process whereby the radiation emissions produced by the laser are amplified to produce a substantially monochromatic, substantially coherent standing light wave. The amplifying medium inside of the optical cavity of the laser can be a crystalline solid, a semiconductor crystal, glass, liquid or gas, provided that the medium is capable of excitation for producing a substantially monochromatic, substantially coherent light wave. A power supply (not shown) supplies power to the laser for exciting the amplifying medium for stimulating the emission of laser radiation.

Figure 4:
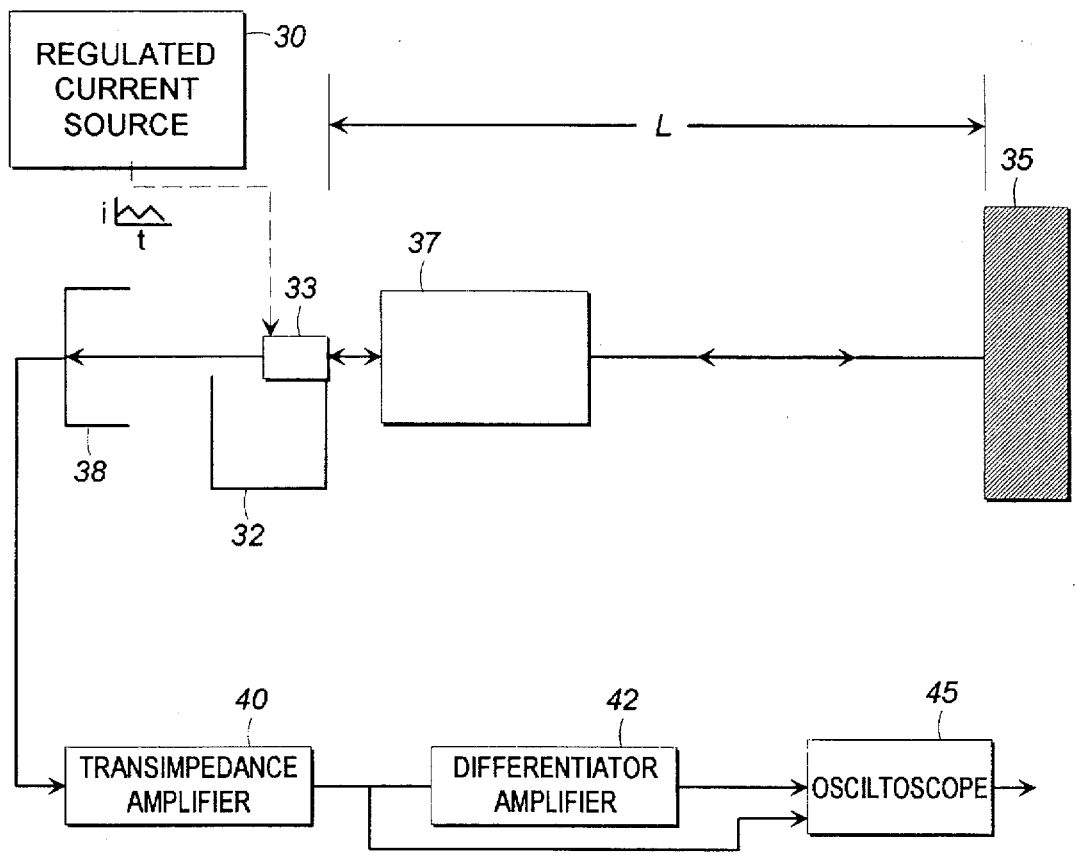
FIG. 4 illustrates a block diagram of a first embodiment of the range finding system of the present invention.

FIG. 4 illustrates a block diagram of a first embodiment of the range finding system of the present invention. As stated above, the present invention is based on the principle that optical feedback reflected from a target onto which the laser light is projected is reflected back into the optical cavity of the laser diode and constructively interferes with the standing waves being produced by the laser diode to produce mode hopping. This constructive interference results in standing waves of different modes occurring outside the optical cavity which couple with the internal standing waves causing the laser diode to mode hop, i.e., the laser generates standing waves of a plurality of different modes.

As first observed by Beheim and Fritsch, the number of modes existing in the optical cavity due to external optical feedback from the target is related to the range of the target from the laser as well as the velocity of the target with respect to the laser.

However, although Beheim and Fritsch recognized that this phenomenon of mode hopping could be used to determine the range and velocity of the target, the system developed by Beheim and Fritsch could not be practically implemented because of its failure to compensate for mechanical vibrations which result from relative motion between the target and the laser. Failure to compensate for these mechanical vibrations results in aliasing of the detected signals being used to calculate the range, direction and velocity of the object, which results in erroneous calculations. These mechanical vibrations can result from movement of the target with respect to the laser while the laser is stationary, movement of the laser with respect to the target while the target is stationary, or movement of the laser and the target with respect to each other and/or with respect to some other fixed reference point. In accordance with the preferred embodiment of the present invention, a laser range finding system is provided which utilizes the mode hopping phenomenon to determine the range of the target from the system and the direction and velocity of the target with respect to the system and which compensates for mechanical vibrations by frequency modulating the laser at a rate which is equal to or greater than $\pi$ times the frequency at which the target is vibrating or oscillating with respect to the laser.

Referring to FIG. 4, a regulated current source 30 is electrically coupled to the laser diode 32 for frequency modulating the laser 33 of laser diode 32 at a predetermined rate which is equal to or greater than $\pi$ times the frequency at which the optical path between the laser diode 32 and the target 35 is modulating. The substantially monochromatic, substantially coherent light produced by the laser diode 32 is collimated by the lens 37 which preferably is a graded refractive index (GRIN) lens. The lens 37 collimates the laser light into a narrow beam and projects the light onto the target 35. Light reflected from the target 35 through lens 37 passes into the optical cavity (not shown) of the laser diode 32 where it constructively interferes with the light being produced by the laser diode 32 to produce a plurality of standing waves of different modes. The optical detector 38, which preferably is a photodiode, is positioned adjacent the laser diode 32 opposite lens 37 for receiving laser light from the laser 30, including the constructively interfering standing waves. The photodiode 38 produces current signals in response to the light intensity impinging on the detector and outputs the current signal to a transimpedance amplifier 40. The current produced by the photodiode 38 is converted by transimpedance amplifier 40 into a voltage signal. The voltage signal produced by the transimpedance amplifier 40 is output to a differentiator amplifier 42 which takes the derivative of the signal received from transimpedance amplifier 40.

Figure 5:
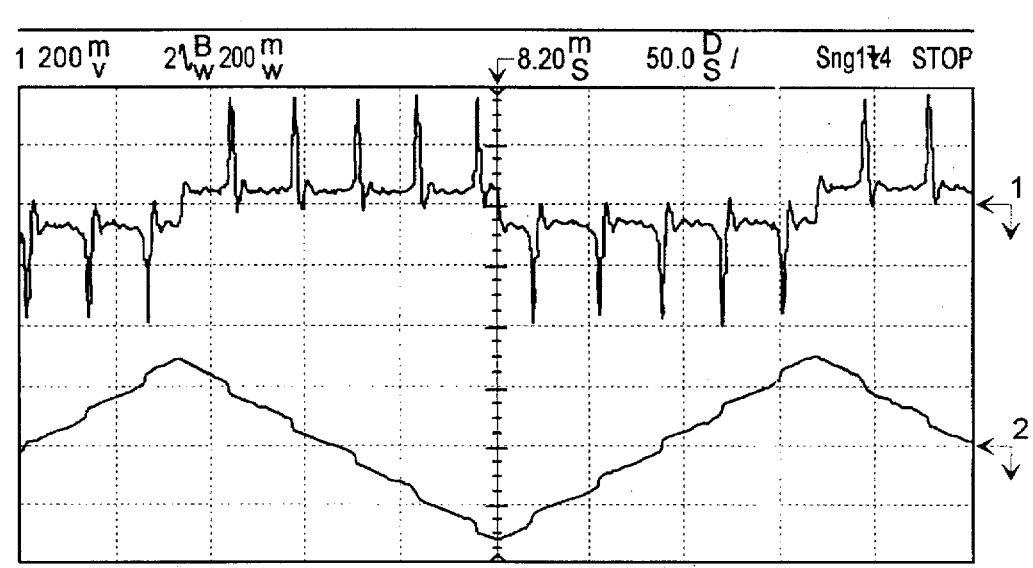
FIG. 5 illustrates an oscilloscope having an upper trace which has intensity spikes which correspond to the mode hop rate of the range finding system.

FIG. 5 illustrates an oscillogram of the voltage signal output from transimpedance amplifier 40 and of the differentiated voltage signal output from differentiator amplifier 42. The lower trace illustrates the peak-to-peak amplitude triangle waveform superimposed with the stair stepping mode hops output from transimpedance amplifier 40. The upper trace is the derivative of the lower trace but with an inversion due to circuitry configuration. Each intensity spike on the upper trace indicates a constructively interfered dual mode pattern. This dual mode pattern occurs for all target speeds (the target is not able to exceed the speed of light), yet the rate of mode hopping is unique for a given velocity, thereby providing the ability to measure the location and velocity of the object with respect to the range finding system.

The outputs of transimpedance amplifier 40 and of differentiator amplifier 42 are input to an oscilloscope so that the rate of mode hopping can be manually determined by viewing the waveforms on the oscilloscope. Alternatively, the output from differentiator amplifier 42 can be input to some other processing means, such as a precision rectifier and frequency-to-voltage converter which rectifies the inverted portions of the square wave and outputs a digital voltage signals corresponding to the intensity spikes. The digital voltage signals can then be further processed to determine the rate of mode hopping over one period of the triangle waveform shown in FIG. 5. The transimpedance amplifier 40 and the differentiator amplifier 42 are schematically illustrated in FIG. 6. FIG. 6 also contains a table of the components which can be used to construct the circuit shown in FIG. 6.

FIG. 7 illustrates a block diagram of a second embodiment of the range finding system of the present invention. The system is essentially the same as the system illustrated in FIG. 4 except that, rather than manually determining the mode hop rate by viewing the output of differentiator amplifier 42 on an oscilloscope, the output of the differentiator amplifier 42 is converted into digital by an analog-to-digital converter 47 and the digital voltage signal is output to a signal processor 50. In accordance with this embodiment, the signal processor, preferably an ADSP-2101 digital signal processor manufactured by Analog Devices, performs a spectral analysis algorithm which transforms the digital voltage signals into frequency domain information and determines the frequency at which the peaks occur. Preferably, the spectral analysis technique includes performing the Burg algorithm using a digital signal processor to determine the mode hop rate in real time. The Burg algorithm accentuates the signal peak which corresponds to the fundamental frequency of the mode hop rate. This peak is used to determine the range, direction and velocity of the object from the range finding system, as discussed in detail below.

Examples of other circuit designs which are suitable for receiving the output of the detector 38 and for processing that output to determine the mode hop rate are illustrated in "A Laser Diode Velocimeter And Rangefinder", thesis of Dipak Patel, 1989, in "Compact And High-Precision Range Finder With Wide Dynamic Range Using One Sensor Head", by Shinohara, et al., IEEE 1991, and in "Optical Feedback Displacement Sensor Using A Laser Diode And Its Performance Improvement", by Kato, et al., *Meas. Sci. Technol.* 6 (1995).

In accordance with an alternative embodiment, the range finding system of the present invention is used as a proximity sensor merely for determining whether or not an object or target is present. By using a relatively low cost collimator, such as a $15.00 Meredith Instruments lens, which provides sufficient backscatter to allow mode hopping to occur only when the object is a certain distance away from the collimator, a proximity sensor is provided which detects the presence or absence of the object or target. In this case, it is unnecessary to determine the velocity and direction of the object because it is only necessary to determine whether or not the object is present.

The presence or absence of the target at the particular distance from the range finding system is determined from the output of differentiator amplifier 42 which indicates the occurrence or non-occurrence of mode hopping.

Figure 8:
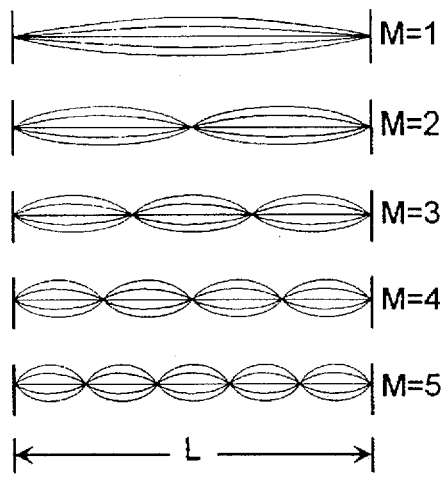
FIG. 8 illustrates different modes resulting from interference coupling of standing waves.

The mode hopping phenomenon used by the present invention and the manner in which the distance, direction and velocity of the object with respect to the range finding system of the present invention are determined will now be described in detail with respect to FIGS. 8 and 9. Since the present invention preferably utilizes a laser as the standing wave generator, the phenomenon of mode hopping, which requires both internal and external feedback, will be described in reference to its occurrence in lasers.

Internal optical feedback is a necessary condition for lazing. Similarly, external optical feedback is a necessary condition for accomplishing the ranging technique of the present invention. The multi-pass nature of a typical laser, together with beam coherence, results in an interference-induced longitudinal mode structure. Only certain frequencies of radiation will set up standing waves within the optical cavity of the laser. Standing waves are produced when two traveling waves of the same amplitude and phase, moving in opposite directions, constructively interfere with each other. Wavelengths satisfying the standing wave condition defined mathematically as $$L = m\lambda_m/2 \qquad \text{Equation (1)}$$

will be amplified, where L equals the length of the optical cavity, m is the mode number for the particular mode of the standing wave and $\lambda_m$ is the wavelength of the standing wave for mode m. An example of these modes is depicted in FIG. 8. The spacing of adjacent cavity modes in Hertz is derived from the fact that the speed of light, c, equals the frequency times the wavelength. Thus, $f = c/\lambda$ and $$\Delta f_I = f_{m+1} - f_m = (m+1)c/2L_I - mc/2L_I, \qquad \text{Equation (2)}$$

where the subscript I represents the internal cavity as opposed to the external cavity, as described in more detail below.

Out of phase reflections are cancelled through destructive interference. Even though the laser cavity is a three dimensional rectangle, only a one-dimensional standing wave exists due to the use of an open resonator consisting of two parallel mirrors, as shown above in FIGS. 2 and 3. A wave traveling off-axis between the two mirrors will escape from the resonator after a few reflections and, therefore, will not represent a cavity mode. Also, photons emitted as a result of waves traveling off-axis will not complete many round-trip passes through the amplifying medium and, therefore, are not significantly amplified. A wave traveling nearly exactly along the axis of the optical cavity will continue to bounce back and forth between the mirrors to set up a standing wave and, therefore, represents a cavity mode. These wave modes continue to extract energy from the amplifying medium as a result of the stimulated emissions.

External optical feedback is the second type of feedback needed to achieve the range finding technique of the present invention. An external standing wave mode will exist for a unique external cavity length, LE, which is the length from the front of the laser to the front surface of the object shown in FIG. 2. The spacing of adjacent external modes in Hertz is given as $$\Delta f_E = f_{m+1} - f_m = (m+1)c/2L_E - mc/2L_E, \qquad \text{Equation (3)}$$

Figure 9:
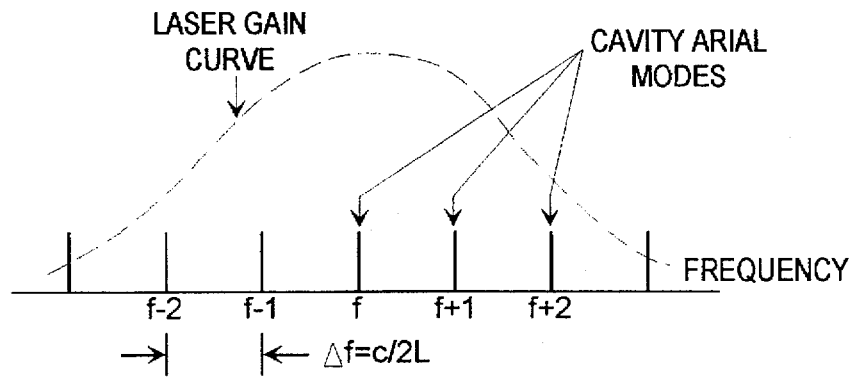
FIG. 9 shows cavity mode spacing for a given external cavity distance.

FIG. 9 shows an example of cavity mode spacing for a given external cavity distance using Equation 3 to calculate the spacing in Hertz.

Interference coupling between the external cavity mode and the internal cavity mode inside the laser diode follows the same laws which apply to interference-induced standing wave coupling inside of the laser optical cavity. Light intensity (measured by the optical detector) will increase with in-phase interference effects between the feedback light and the laser oscillation at an external cavity length $L_B$ equal to an integer multiple of the internal free-running wavelength of the laser diode. The light intensity increases not only because of the constructive interference, but also because of the additional energy extracted from the amplifying medium as a result of an increase in stimulated emissions.

Figure 10:
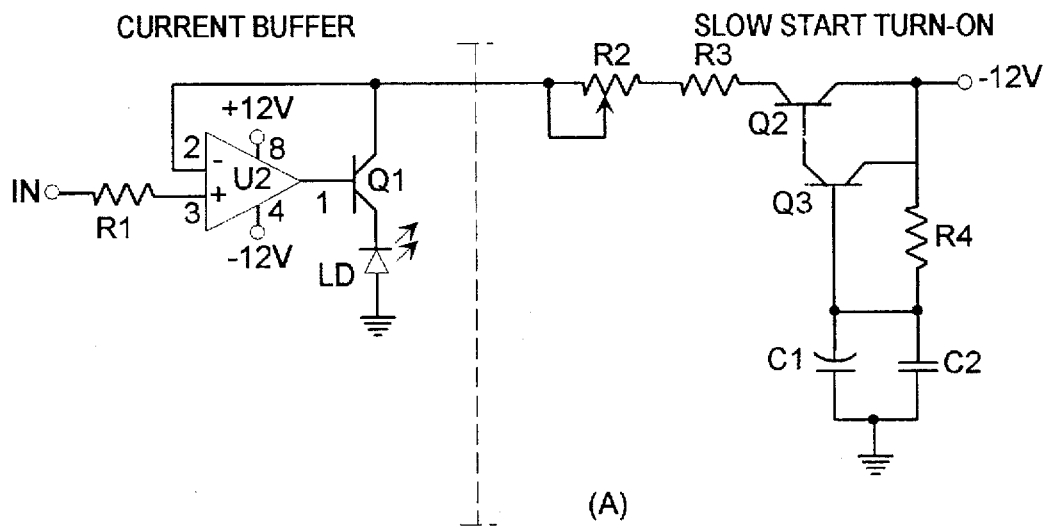
FIG. 10 schematically illustrates circuit components which may be used in connection with a current generator for frequency modulating the standing wave generator of the present invention.

As stated above, the cavity mode space is unique for each distance $L_B$. A change in cavity mode spacing will result if either the target distance $L_B$, the laser free-running frequency, or both, are changed. In accordance with the present invention, both the target distance and the laser free-running frequency are modulating. The target is modulating due to mechanical vibration in the system and/or in the object. In accordance with a preferred embodiment of the present invention, the laser diode is frequency modulated with a Hameg waveform generator (triangle waveform) and current buffer at 55 mA dc, 10 mA peak-to-peak at 3 kHz. A slow turn-on circuit is preferably used to cancel harmful transients which may shorten the life of the laser diode. In accordance with the present invention, it has been determined that the laser diode should be biased midway between its threshold current and the point at which free-running laser mode hopping begins. With the single mode laser, the internal laser diode cavity has a cavity mode spacing which is much greater than the external cavity mode spacing. If the internal modes occur due to laser frequency modulation, then the external modes will mix indiscriminately with the internal modes. Therefore, free-running laser mode hop should be avoided during set-up. The internal modes have a much wider mode hop rate than the external modes. In order to look at mode hopping due to the occurrence of the external modes only, the laser should be frequency modulated almost to the point of internal mode hopping. In this way, the frequency is modulated at a sufficiently high rate to prevent aliasing, but at a rate which is lower than that required to produce mode hopping due only to internal modes. The current buffer and slow-start turn on circuits are schematically illustrated in FIG. 10.

When modulating the laser diode drive current, an increase in drive current shifts the laser emission to a slightly longer wavelength by increasing the temperature of the laser cavity and, consequently, the refractive index of the amplifying medium is changed. Equation 3, above, utilizes the speed of light in a vacuum, which is approximately $3 \times 10^8$ m/sec. In any other medium, the velocity of light changes in accordance with the following equation:

$$\Delta f_I = c/2L_I = c/2n_{eff}l_I \qquad \text{Equation (4)}$$

Where $L_I$, $l_I$, and $n_{eff}$ are the effective diode cavity length, the geometrical diode cavity length, and the effective refractive index in the amplifying medium, respectively.

Therefore, these factors are taken into consideration in calculating the range, direction and velocity of the object with respect to the range finding system.

The Doppler effect is also taken into consideration in determining the range, direction and velocity of the object with respect to the present invention. Movement of the object toward and away from the laser or in directions transverse to the axis of the laser causes a change in the time between mode hops as well as a change in the polarity of the mode hop spikes shown in the upper trace in FIG. 5. Because of the Doppler effect, the range, direction and velocity can be determined from the mode hop rate during the up and down slope of the stair stepped triangle waveform output from the optical detector, as observed by Patel in his thesis, discussed supra. The following expression relates the object or target range, L, to the laser light frequency change $\delta f$ per mode $\delta N$, where c is the speed of light:

$$\delta f/\delta N = c/2L \qquad \text{Equation (5)}$$

The frequency of the laser is changed by modulating the laser diode current with the triangle wave form, as stated above. During the positive ramp of the triangle modulation wave, a frequency change $\delta f$ produces $\delta N_1 c/2L$ mode hops. During the negative ramp of the triangle wave, the same frequency change produces $\delta N_2 c/2L$ mode hops (if the external cavity space is constant, i.e., if the target is stationery, then $\delta N_1$ equals $\delta N_2$). The range L is obtained by averaging the mode hops on the upward and downward ramps:

$$L=c/4(\delta N_1/\delta f + \delta N_2 \delta f) \qquad \text{Equation (6)}$$

Using the Chain Rule $\delta N/\delta f = \delta N/\delta t * \delta t/\delta f$, and equation 6 can be written in the form:

$$L=c/4 \ (\delta N_1/\delta t + \delta N_2/\delta t)\delta t/\delta f \qquad \text{Equation (7)}$$

Let $\delta N/\delta t = F$, where F is the mode hop rate. Hence, $$L=c/4*1 \ /(\delta f/\delta t)*(F_1+F_2) \qquad \text{Equation (8)}$$

When the laser is modulated and the target is moved, the differential rate of mode hops on the upward and downward ramp yields the speed $S=\delta L/\delta t$. It follows that this speed can be obtained by $$S=\lambda/2*(F_2-F_1) \qquad \text{Equation (9)}$$

As stated above, the direction of motion is determined based on the polarity of the mode hop spikes.

Patel in his thesis observed that the above equations do not depend on amplitude and are only time or frequency dependent. In accordance with the present invention, it has been determined that the observation made by Patel is not true in environments where the target is vibrating or oscillating with respect to the system resulting in signal-to-noise breakdown due to aliasing. Furthermore, Patel also stated that the frequency modulation rate of the laser was not a factor which needed to be considered. To the contrary, in accordance with the present invention it has been determined that the frequency modulation rate of the standing wave generator is critical in real-world environments where vibration is a factor which must be taken into consideration.

Figure 11:
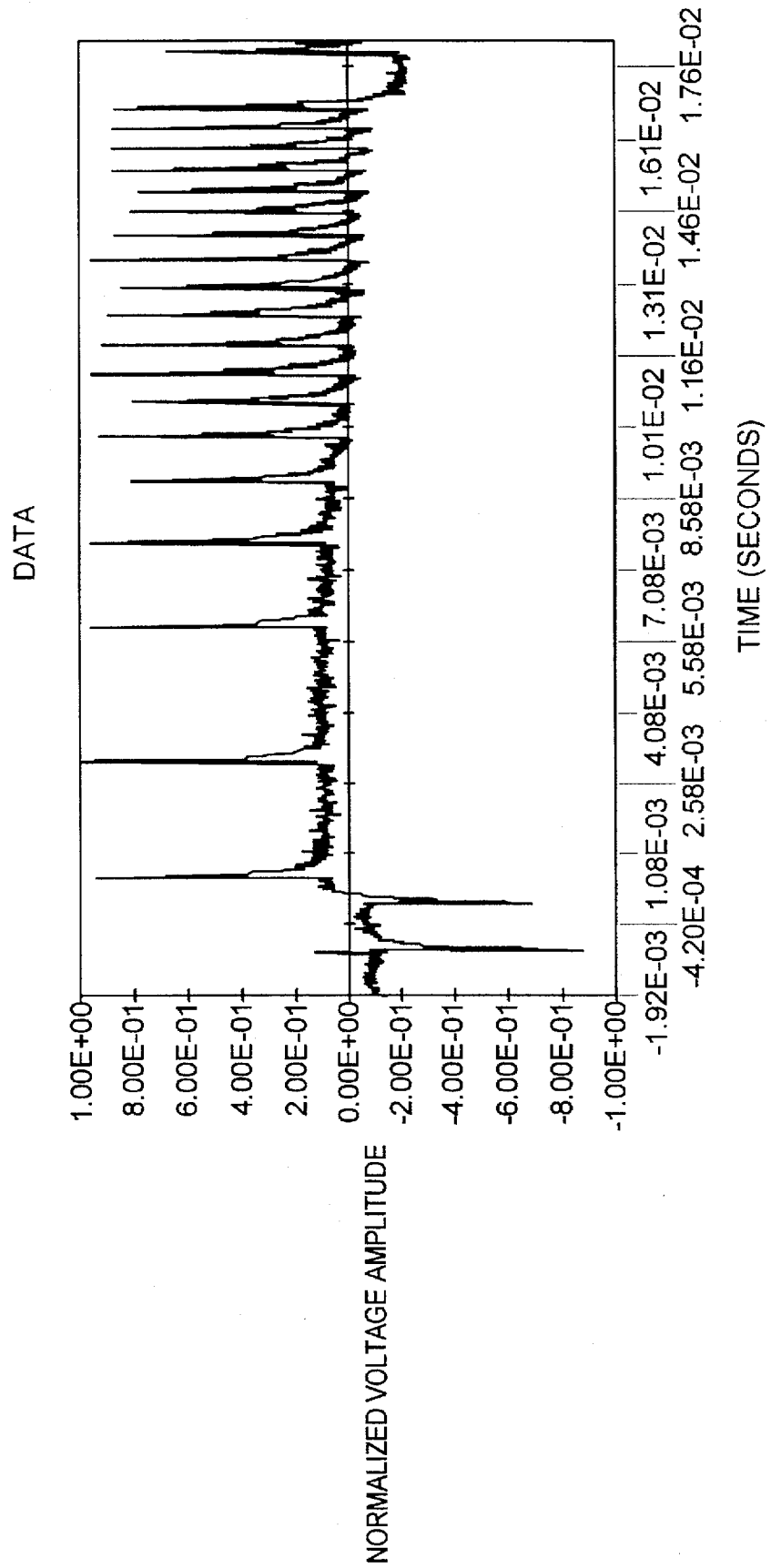
FIG. 11 illustrates the output from the optical detector of a laser range finding system when the rate at which the standing wave generator is modulated is too slow.

In reducing the present invention to practice, it was experimentally determined that the frequency modulation rate of the laser is critical by setting up an experiment which used the system described by Beheim and Fritsch in the article entitled "Range Finding Using Frequency-Modulated Laser Diode", *Applied Optics*, Vol. 25, No. 9, May 1986, pp. 1439–1442 and by visually observing the vibration problem dynamically on an oscilloscope. FIG. 11 shows the output from the optical detector as observed on the oscilloscope during one FM ramp differentiated. For the experiment, the laser was modulated at a rate of 30 Hz and the system was tested in a quiet and apparently vibration-free room without an anti-vibration table. Based on the observations made during the experiment, it was determined that the low rate at which the laser was frequency modulated resulted in aliasing. Aliasing was deemed to have occurred due to the frequency of the data waveform (the frequency of vibration of the object with respect to the system) being higher than the frequency of the triangle-shaped driving waveform. It was determined that when the Doppler effect changes faster than the frequency of the triangle-shaped driving waveform, the data waveform will alias.

Thus, the present invention overcomes problems inherent in the prior art system developed by Beheim and Fritsch by modulating the laser at a frequency equal to or greater than $\pi$ times the frequency at which the object is vibrating with respect to the range finding system and by analyzing the information obtained from the optical detector over one period of the triangle waveform such that the target appears static within the analysis interval. Thus, the vibration velocity appears constant during one period of the faster triangle waveform, holding the dual up-down slope Doppler mode hop rates constant for the vibrating target, the laser, or both.

The mode hop measuring operation of the present invention is analogous to a pulse-width-modulated (PWM) sampler (proportionality constant valid with both triangle and sawtooth waveforms), particularly useful for achieving variable-speed control of a DC motor in digital systems. In accordance with the present invention, it was determined that the key to successful conversions with a PWM is the same as that required for successful elimination of mechanical vibrations in the range finding system of the present invention. The requirement being that the carrier frequency must be much higher than the highest rate of velocity change of the data. This observation can be understood by examining a substitution of a sample and hold A/D converter with a PWM sampler. A sample and hold A/D converter keeps the sampled data amplitude constant over the duration of the same period. Likewise, the data wave must essentially appear constant to the much faster PWM period in order to effectively maintain a constant data amplitude during the PWM sample period and conversion. The range finding system of the present invention fits the same scenario. As stated above, the vibration velocity must essentially appear constant during one period of a much faster triangle waveform, holding the dual up-down slope Doppler mode hop rates constant for a vibrating target, laser, or both. The exact relationship between the rates is desirable in order to maintain the lowest cost associated with lower sample rate A/D converters, i.e., the higher the triangle waveform, the faster the mode hop rates.

In accordance with the present invention, it was determined that the well known Shannon rate is not sufficient for pulse code modulation. The Shannon theorem is mathematically defined as $f_\Lambda/f_{displacement} > 2$. Instead, the theorem developed by Cattermole was applied to the present invention. Cattermole's theorem relates to invalid sampling frequencies of a sawtooth (1/T) for a sine wave of less than ½T. In accordance with this theorem, only one intersection must occur during each interval T. To prevent an invalid condition from occurring, the slope of the reference sawtooth must exceed the slope of the signal waveform. The derivations presented by Cattermole, which, in the interest of brevity are not discussed here, show that full modulation occurs at the ratio of $\pi$. Therefore, in accordance with the present invention, it was determined that the standing wave generator of the range finding system of the present invention must be modulated at a frequency equal to or greater than $\pi$ times the frequency at which the object is vibrating in order to provide proper sampling to prevent aliasing.

Figure 12:
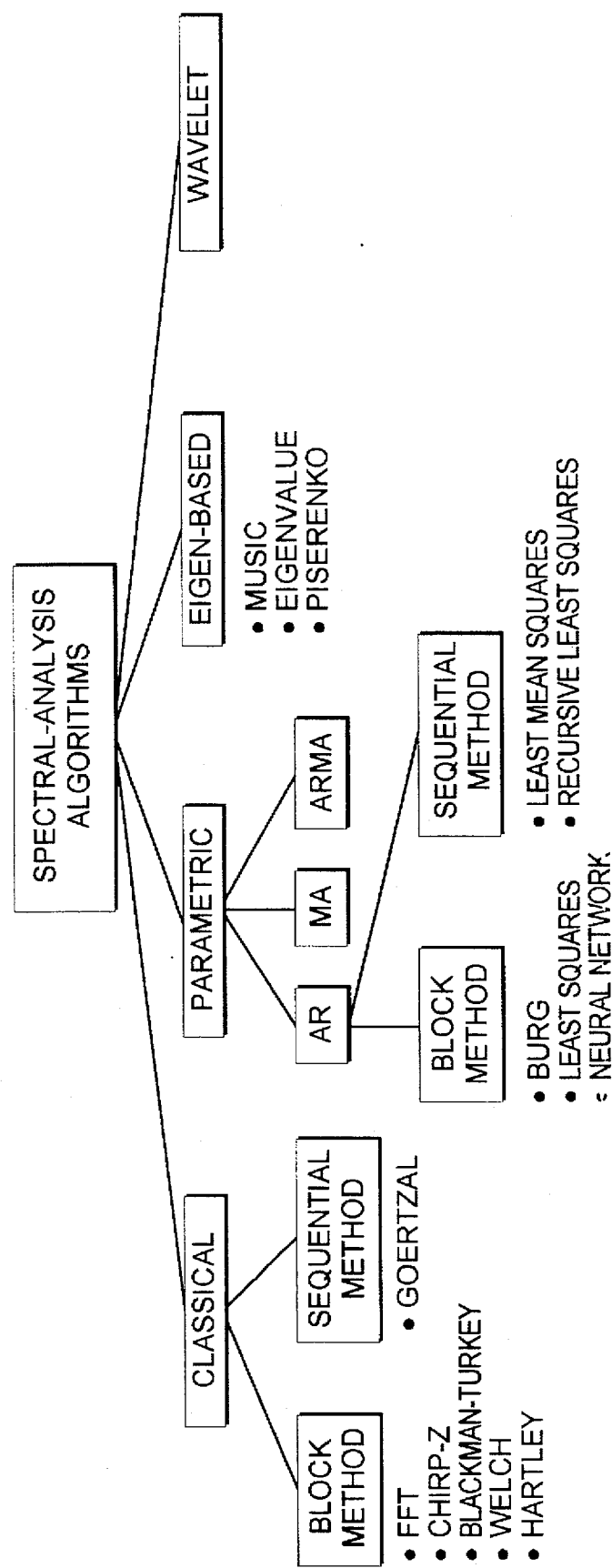
FIG. 12 illustrates various spectral analysis algorithms which may be suitable for use with the present invention.
Figure 13A:
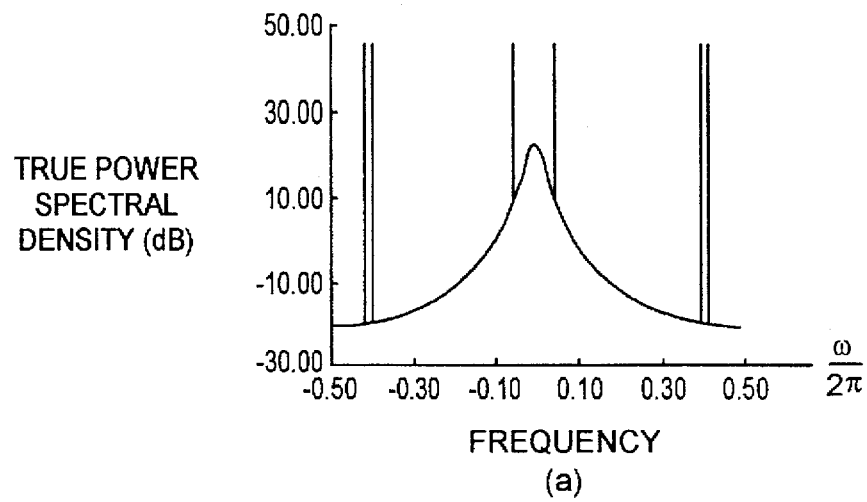
FIG. 13 and 14 illustrate frequency responses for various spectral analysis algorithms.
Figure 13B:
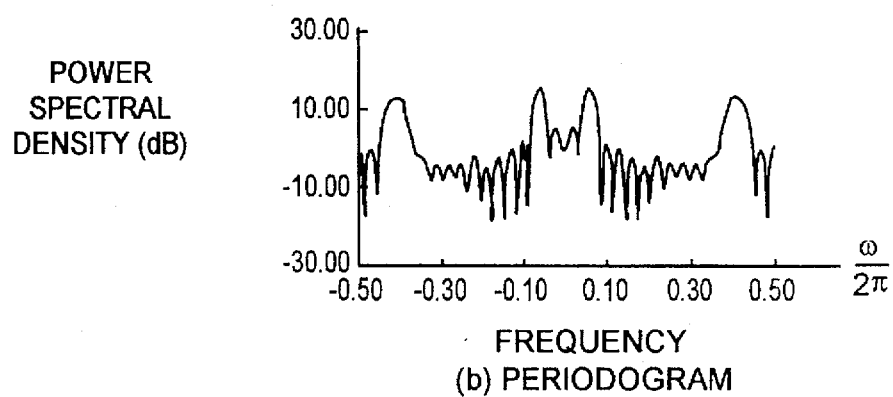
Figure 13C:
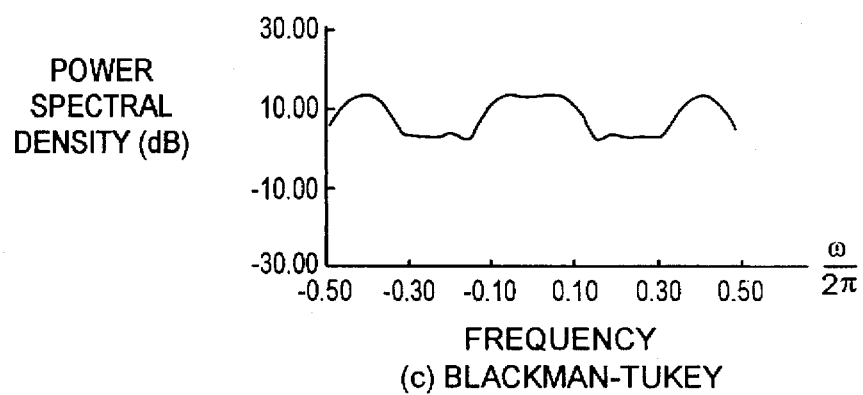
Figure 13D:
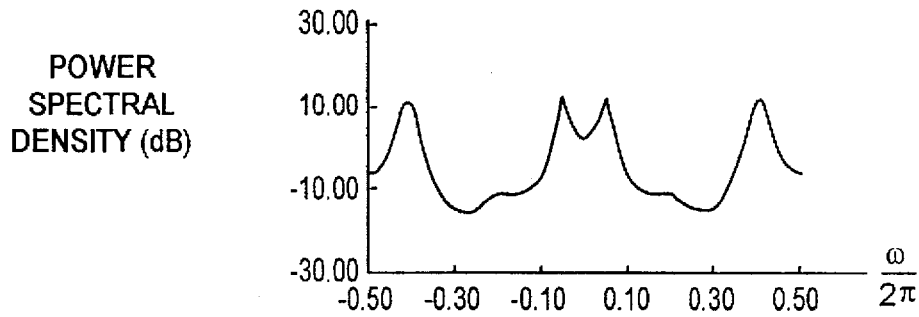
Figure 13E:
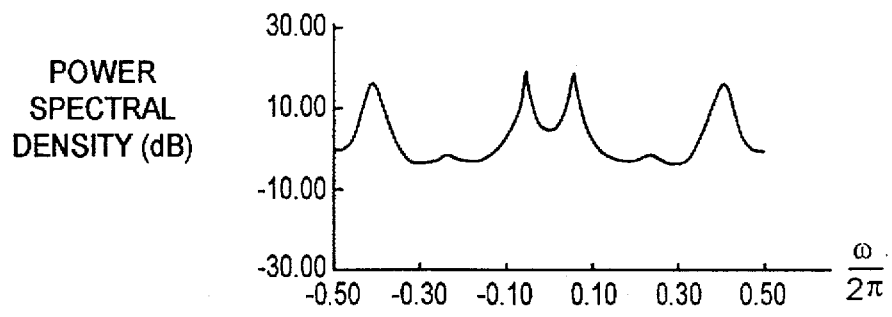
Figure 13F:
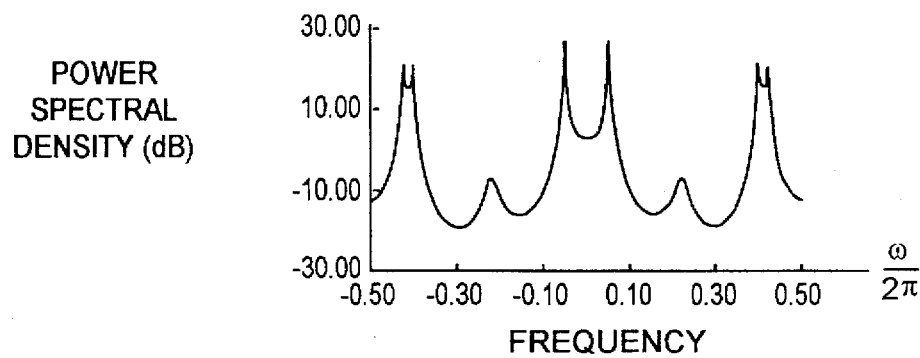
Figure 14A:
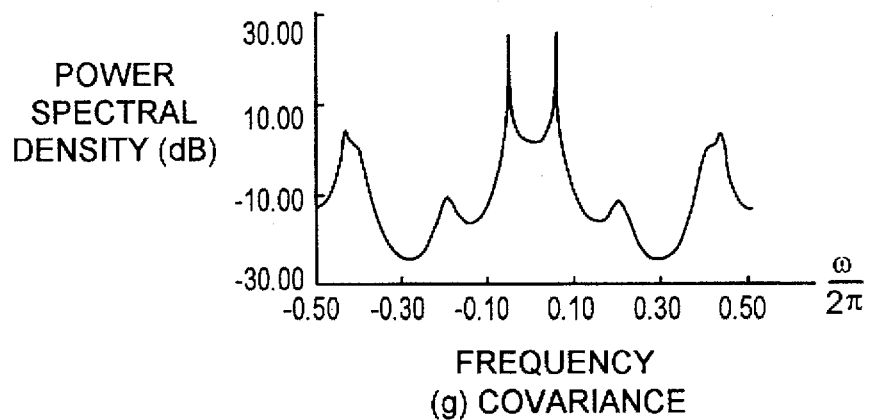
Figure 14B:
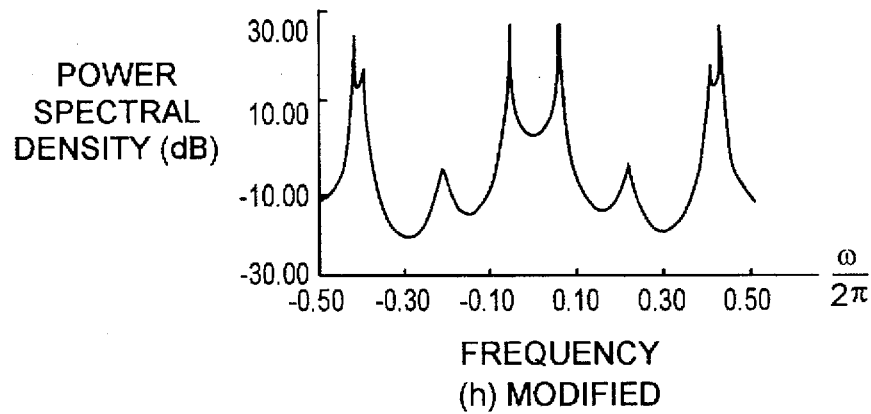
Figure 14C:
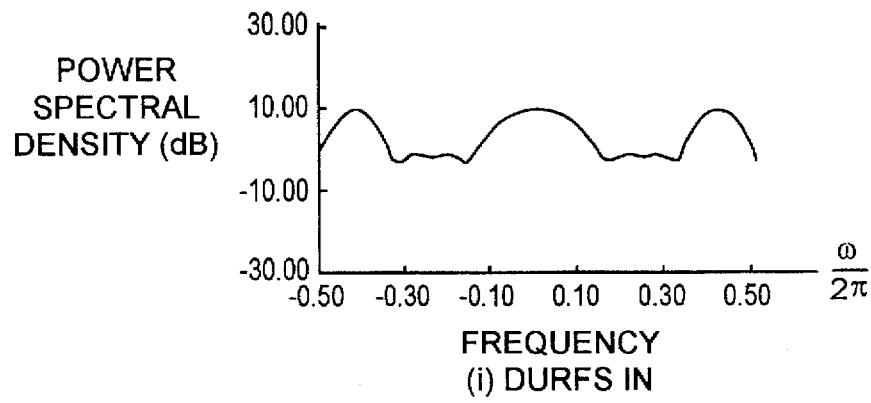
Figure 14D:
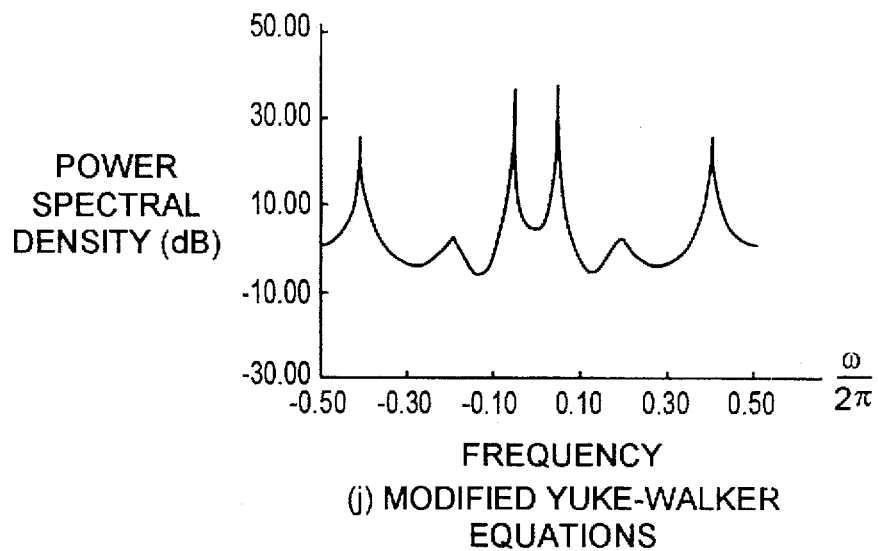
Figure 14E:
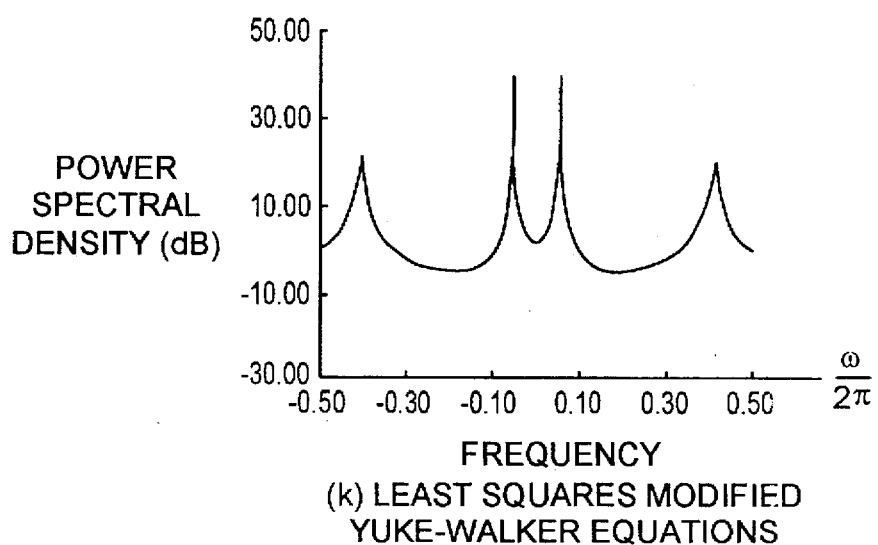

The accuracy of the system of the present invention can be improved by using various signal processing techniques to make the system less amplitude dependent. For example, by using a frequency-to-voltage converter or a phase locked loop, an enhancement in accuracy can be realized by improving the signal-to-noise ratio with autocorrelation. The autocorrelation function is provided in the digital signal processor used in accordance with the preferred embodiment discussed above. Although the Burg algorithm is a suitable spectral analysis algorithm for use with the present invention, spectral analysis algorithms other than the Burg algorithm can also be used with the present invention. Furthermore, the present invention is not limited to using a particular spectral analysis algorithm, and it is not necessary that spectral analysis techniques be used at all. FIG. 12 provides a global view of examples of several spectral analysis algorithms which are suitable for use with the present invention. These techniques deal with the problematic assumption of the classical signal processing techniques that the portion of the signal contained within the time series is periodic outside the analysis window, replicating the waveform inside the window to plus-minus infinity. This leads to distorted power spectral densities (PSD) estimates. Improvements in these assumptions about how these sample signals behave outside the observation interval leads to direct improvements in the PSD. Some of these methods assume that the data outside the analysis window is zero, while others assume maximum entropy or randomness. These methods are model or parametric-based estimators that extrapolate the random signal outside the analysis window. The estimated model which is based on the transfer function of the system to which it is being applied generates the closest fit to the observed data when driven by white noise. The model can be based on the autoregressive (AR), the moving average (MA), the autoregressive moving average (ARMA) or the rational function digital filter. The AR model tends to emphasize the peaks in the frequency spectrum while the MA tends to emphasize the nulls. The ARMA model is a combination of the AR and MA models.

FIGS. 13 and 14 illustrate the frequency responses for various spectral analysis techniques which are suitable for use with the present invention. These graphs indicate that the Burg and modified covariance algorithms are excellent analyzers. Both are AR-based and, consequently, are computationally efficient.

Figure 15:
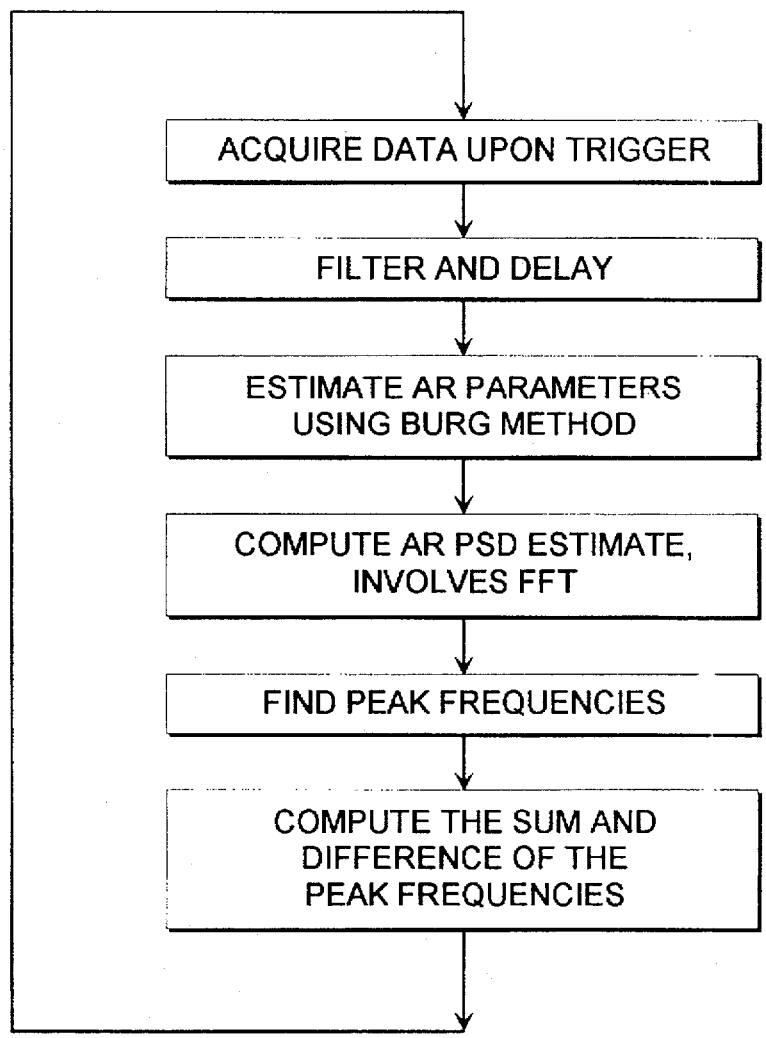
FIG. 15 illustrates a flow chart of the spectral analysis algorithm of the present invention in accordance with a preferred embodiment.

In accordance with the preferred embodiment, the Burg algorithm is implemented using an ADSP-2101 digital signal processor. FIG. 15 illustrates a general block diagram of one embodiment of the digital signal processing algorithm of the present invention. The DSP algorithm repeatedly acquires the data with 116 samples, stores the filtered data after delaying half the filter length to allow for the initial settling time of the digital filter, executes the Burg algorithm, executes the optimized fast fourier transform (FFT), and then finds the peak frequencies which are used to determine the range, direction and velocity of the target. Thus, the digital signal processor algorithm carried out by the DSP determines the mode hop rate and the distance, velocity and direction of the target, independently of each other, with respect to the system of the present invention while, at the same time, enhancing the accuracy of the system by improving the signal-to-noise ratio. Attached as Appendix A is a printout of the DSP code in Assembly language which was used to perform the digital signal processing algorithm including data acquisition. The code, however, does not take into account Doppler effect because it was only used for experimental purposes. The code can easily be modified to take Doppler effect into account by modifying it to acquire and process data on both the upward and downward slopes of the triangle waveform, as opposed to only on the upward slope.

It should be noted that although the present invention has been described with respect to specific embodiments, the present invention is not limited to these specific embodiments. It will be apparent to those skilled in the art that a variety of different hardware and/or software components can be implemented to accomplish the present invention. For example, it should be noted that the circuitry for detecting the mode hops and for determining the mode hop rate and the distance, velocity and direction of the object with respect to the system can be accomplished in a variety of different ways. Although several embodiments have been discussed which illustrate certain types of hardware capable of determining the rate of mode hopping and the distance, direction and velocity of the object with respect to the system, the present invention is not limited to these embodiments. It will also be apparent to those skilled in the art that a variety of different spectral analysis techniques can be used for enhancing signal-to-noise ratio and for determining the mode hop rate. It should also be noted that the present invention is not limited with respect to the type of standing wave generator used to carry out the invention. Although conventional lasers, masers and matter wave generators have been mentioned as standing wave generators suitable for use with the present invention, it may also be possible to use other means for generating a standing wave, either existing now or which may be developed in the future, provided the standing wave generator is capable of exhibiting feedback-induced standing wave interference mode hopping.

What is claimed is:

1. An apparatus for determining the range, direction and velocity of an object, said apparatus comprising:
   a standing wave generator for generating standing waves and for projecting the standing waves onto the object;
   means for detecting the standing waves generated by the standing wave generator and standing waves resulting from interference between the standing waves generated by the standing wave generator and standing waves reflected from the object and for producing electrical signals in response to the standing waves detected;
   means for processing the electrical signals produced by said means for detecting the standing waves, said means for processing being electrically coupled to said means for detecting the standing waves for receiving the electrical signals produced by said means for detecting the standing waves, wherein a frequency modulated electrical signal is supplied to said standing wave generator for causing said standing wave generator to generate a frequency modulated standing wave having a frequency which is equal to or greater than $\pi$ times the highest frequency at which the optical path between the object and said apparatus is modulating, and wherein causing said standing wave generator to generate a frequency modulated standing wave having a frequency equal to or greater than $\pi$ times the highest frequency at which the optical path between the object and said apparatus is modulating prevents aliasing; and
   means for determining a mode hop rate of said standing wave generator and for determining the range, direction and velocity of the object with respect to said apparatus based on the determined mode hop rate of said standing wave generator.

2. An apparatus according to claim 1 wherein said means for processing the electrical signals determines the mode hop rate of said standing wave generator over at least one period of the frequency modulated electrical signal.

3. An apparatus according to claim 1 wherein said means for processing the electrical signals converts the electrical signals into digital information and performs a spectral analysis algorithm on the digital information which transforms the digital information into frequency domain information and determines the mode hop rate of said standing wave generator based on peaks occurring in the frequency domain information.

4. An apparatus according to claim 1 wherein said means for processing the electrical signals comprises a digital signal processor.

5. An apparatus according to claim 4 wherein said spectral analysis algorithm comprises the Burg algorithm.

6. An apparatus according to claim 2 wherein said means for processing the electrical signals converts the electrical signals into digital information and performs a spectral analysis algorithm on the digital information which transforms the digital information into frequency domain information and determines the mode hop rate of said standing wave generator based on peaks occurring in the frequency domain information.

7. An apparatus according to claim 6 wherein said means for processing the electrical signals comprises a digital signal processor.

8. An apparatus according to claim 7 wherein said spectral analysis algorithm comprises the Burg algorithm.

9. An apparatus for determining the range, direction and velocity of an object with respect to said apparatus, said apparatus comprising:
   a laser comprising an optical cavity having a first end and a second end, said first and second ends each comprising a surface which is partially transmissive and partially reflective, said optical cavity having a laser medium therein which is excitable to produce radiation emissions;
   means for detecting light and for producing electrical signals in response to the light detected, said means for detecting light disposed in proximity to said second end for receiving light transmitted through said second end of said laser;
   means for collimating light disposed in proximity to said first end of said laser for collimating light transmitted through said first end of said laser and for projecting a collimated beam of light onto the object;
   means for processing the electrical signals produced by said means for detecting light, said means for processing being electrically coupled to said means for detecting light for receiving the electrical signals produced by said means for detecting light, wherein a frequency modulated electrical signal is supplied to said laser for causing said laser to generate a frequency modulated standing light wave having a frequency which is equal to or greater than $\pi$ times the highest frequency at which the optical path between the object and said laser is modulating, wherein causing said standing wave generator to generate a frequency modulated standing wave having a frequency equal to or greater than $\pi$ times the highest frequency at which the optical path between the object and said laser is modulating prevents aliasing, and wherein said means for processing the electrical signals determines the mode hop rate of said laser; and
   means for determining the range, direction and velocity of the object with respect to said apparatus on the basis of the mode hop rate.

10. An apparatus according to claim 9 wherein said means for processing the electrical signals determines the distance, direction and velocity of the object with respect to said apparatus independently of each other on the basis of the mode hop rate.

11. An apparatus according to claim 9 wherein said means for processing the electrical signals converts the electrical signals into digital voltage signals and performs a signal processing algorithm on the digital voltage signals which transforms the digital voltage signals into frequency domain information and determines where any peaks in the frequency domain information occur, and wherein the determination as to the occurrence of peaks is used to determine the mode hop rate of said laser.

12. An apparatus according to claim 10 wherein said means for processing the electrical signals converts the electrical signals into digital signals and performs a signal processing algorithm on the digital voltage signals which transforms the digital voltage signals into frequency domain information and determines where any peaks in the frequency domain information occur, and wherein the determination as to the occurrence of peaks is used to determine the mode hop rate of said laser.

13. A method for determining the range, direction and velocity of an object, said method comprising the steps of:

(1) frequency modulating a standing wave generator with a frequency modulated electrical signal to produce standing waves wherein the frequency of the frequency modulated electrical signal is equal to or greater than $\pi$ times the highest frequency at which the optical path between the object and the standing wave generator is modulating such that aliasing is prevented;

(2) projecting the standing waves onto the object;

(3) detecting interference coupling between the standing waves generated by the standing wave generator and standing waves reflected from the object;

(4) determining a mode hop rate of the standing wave generator resulting from the interference coupling of the standing waves; and (5) determining the distance, direction of motion and velocity of the object based on the determined mode hop rate.

14. A method according to claim 13 wherein step (4) comprises the steps of performing a spectral analysis technique on the digital representation which transforms the digital representation into frequency domain information and determines the mode hop rate based on the occurrence of peaks in the frequency domain information.

15. A method according to claim 13 wherein step (3) comprises the steps of:

(1) sensing the interference coupling with a detector which produces electrical signals in response to standing waves impinging on the detector; and (2) sampling the electrical signals and converting the electrical signals into digital information.

16. A method according to claim 14 wherein step (3) comprises the steps of:

(1) sensing the interference coupling with a detector which produces electrical signals in response to standing waves impinging on the detector; and (2) sampling the electrical signals and converting the electrical signals into digital information.

17. A method for determining the range, direction and velocity of an object which is modulating with respect to a laser of a laser range finding system, said method comprising the steps of:

(1) frequency modulating the laser of the laser range finding system with a frequency modulated electrical signal to produce a standing wave of laser light having a frequency which is equal to or greater than $\pi$ times the highest frequency at which the optical path between the object and the laser is modulating, wherein frequency modulating the laser to produce a standing wave of laser light having a frequency equal to or greater than $\pi$ times the highest frequency at which the optical path between the object and the laser is modulating prevents aliasing;

(2) projecting the laser light onto the object, wherein light reflected from the object is reflected back into the laser as external optical feedback, and wherein at least some of the external optical feedback constructively interferes with the standing wave of laser light produced by the laser to create a plurality of standing light waves of different modes;

(3) detecting the plurality of standing light waves of different modes;

(4) determining the mode hop rate of the laser over a predetermined period of time; and (5) determining the distance, direction and velocity of the object independently of each other based on the mode hop rate determined over the predetermined period of time.

18. A method according to claim 17 wherein step (4) includes performing a spectral analysis algorithm to determine frequency peaks from which the determination is made as to the mode hop rate.

19. A method according to claim 17 wherein step (3) comprises the steps of:

(1) sensing the plurality of standing light waves of different modes with a detector which converts the light waves into electrical signals; and (2) sampling the electrical signals and converting the electrical signals into digital information.

20. A method according to claim 19 wherein step (4) comprises the steps of:

(1) performing a spectral analysis algorithm on the digital information which transforms the digital information into frequency domain information and determines how many different frequencies exist in the light waves detected by the detector over a predetermined period of time; and (2) using the determination obtained by performing the spectral analysis algorithm to determine the mode hop rate of the laser.

* * * * *